United States Patent [19]

Hasan

[11] Patent Number: 6,044,416
[45] Date of Patent: Mar. 28, 2000

[54] CONFIGURABLE FIRST-IN FIRST-OUT MEMORY INTERFACE

[75] Inventor: Arshad Hasan, Fremont, Calif.

[73] Assignee: Samsung Electronics Co., Ltd., Suwon, Rep. of Korea

[21] Appl. No.: 08/933,678

[22] Filed: Sep. 19, 1997

[51] Int. Cl.[7] .................................................. G06F 13/14
[52] U.S. Cl. ............................... 710/52; 710/52; 710/53; 710/54; 711/149; 711/100; 711/170; 714/5; 714/7
[58] Field of Search .................................... 395/711, 149, 395/150, 151, 154, 110, 365, 235, 872, 873, 874; 710/52–54; 711/100, 149, 170; 714/5, 7

[56] References Cited

U.S. PATENT DOCUMENTS

| | | | |
|---|---|---|---|
| 5,315,184 | 5/1994 | Benhanida | 327/19 |
| 5,325,487 | 6/1994 | Au | 711/131 |
| 5,712,992 | 1/1998 | Hawkins | 395/877 |

OTHER PUBLICATIONS

Quality Semiconductor, Inc. "High Speed CMOS 4K ×9 FIFO with Output Enable", all pages Jun. 6, 1995.
Quality Semiconductor, inc., "High–Speed CMOS 1K ×36 Clocked FIFO with Bus Sizing", all pages, Jul. 17, 1995.
Andre Dehon, "Transit Note #188 Notes on Coupling Processors with Reconfigurable Logic", pp. 18–19, Mar. 21, 1995.
Tom Jackson, Texas Instruments, "Parity–Generate and Parity–Check Features for High–Bandwidth Computing FIFO Applications", all, Mar. 1996.
Quality Semiconductor Inc., "High–Speed CMOS 256 ×36 2 Bi–directional FIFO", all, Apr. 24, 1995.

*Primary Examiner*—Meng-Ai T. An
*Assistant Examiner*—Stacy Whitmore
*Attorney, Agent, or Firm*—Kenneth L. Sherman, Esq.; Sherman & Sherman; Jeffrey P. Aiello

[57] ABSTRACT

A first-in first-out (FIFO) memory interface is provided by coupling an input register and an output register to a conventional static random access memory (SRAM). The registers and SRAM are coupled to control logic that controls the timing of shift-in (write) and shift-out (read) operations. Upon receipt of a write request signal, input data is received from the requesting device and buffered within the input register. The buffered data is then stored in the SRAM during a write operation. Upon receipt of a read request signal, the data previously buffered in the output register is provided to the requesting device and during an associated read operation the next stored data in the SRAM is retrieved and buffered within the output register. The control logic is programmable and is therefore capable of supporting different SRAM configurations. The control logic can also be implemented in a conventional programmable logic device.

20 Claims, 5 Drawing Sheets

CONFIGURABLE FIRST-IN FIRST-OUT MEMORY INTERFACE

TECHNICAL FIELD

The present invention relates to memories and interfaces that are used with two or more devices that share data, and more particularly to methods and apparatus that provide a first-in first-out (FIFO) memory interface.

BACKGROUND ART

Conventional first-in first-out memory interfaces (FIFO interfaces) are often used to temporarily store data that is being shared between two or more external devices. As the name implies, data that is received from an external input device is stored in sequential order and subsequently provided to the external output device in the same sequential order. FIFO interfaces are typically employed to accommodate external devices that operate asynchronously, because the FIFO interface can receive the input data at an input rate that is different from the output rate. Thus, the FIFO interface allows the external devices to share data although each device is communicating at different rates. Such a FIFO interface is considered a rate matching FIFO. FIFO interfaces are extremely useful in systems that have a plurality of external devices that share a common resource, such as, for example, a high-speed or low-speed communication link or bus. By way of example, FIFO interfaces are often used in computer systems having a plurality of input/output (I/O) devices and in communication systems having a plurality of devices coupled to a communication medium. In these systems, a FIFO interface stores the data received until such time that the receiving device can process the data.

FIG. 1 is a block diagram depicting a system 10 having at least one input device 12 that is configured to share data through a FIFO interface 14 to at least one output device 16. Input device 12 and output device 16 represent circuits or devices, each of which is typically separate from one another and FIFO interface 14. As shown, input device 12 is typically configured to send and/or receive one or more control signals to and/or from FIFO interface 14 to coordinate the transfer of data from input device 12 to FIFO interface 14. For example, to send data to FIFO 14, input device 12 asserts a write request signal that causes FIFO interface 14 to "shift in" or store the data provided by input device 12. FIFO 14 will accept and store the data in this manner until such time as FIFO interface 14 reaches a predetermined or full state in which case FIFO 14 will no longer accept additional input data from input device 12. Once FIFO interface 14 has stored data from input device 12, output device 16 can assert a read request signal that causes FIFO interface 14 to "shift out" or retrieve the stored data. The stored data will be provided to output device 16 in the same sequence as stored by input device 12.

FIFO interface 14 typically includes a dual-ported random access memory (RAM) having a specific configuration. A conventional dual-ported RAM has a data port dedicated for use by input device 12 and a separate data port dedicated for use by output device 16 and is configured to allow input device 12 and output device 16 to simultaneously access different stored data.

The configuration of FIFO interface 14, and in particular the configuration of the dual-ported RAM (e.g., the addressing scheme, data width, memory length and speed), define the types of applications and systems in which FIFO interface 14 can properly function. Therefore, manufacturers of FIFO interfaces typically provide a variety of different configurations that can be used in many applications and systems. For applications having unique FIFO interface requirements, several design techniques have been developed in order to meet the system's requirements, such as, for example, cascading several FIFO interfaces and/or adding additional circuitry. Unfortunately, configuring a unique FIFO interface from available FIFO interfaces and circuitry can greatly increase the cost, waste space and/or power, and limit the system's effectiveness. Thus, there is a need for a configurable FIFO interface that can support the unique requirements of such systems.

SUMMARY OF THE INVENTION

The present invention provides methods and apparatus that provide a FIFO interface that is configurable to meet the needs of a variety of applications and systems. In accordance with certain aspects of the present invention, the FIFO interface advantageously makes a conventional random access memory (RAM) function similar to a dual-ported RAM. Thus, the FIFO interface uses existing RAM technology to provide a flexible and configurable arrangement capable of meeting the needs of many applications and systems, especially those requiring large memory capabilities.

In accordance with one embodiment of the present invention, a FIFO apparatus is provided for use with an external input device and an external output device. The apparatus includes a memory, an input register, an output register, and logic. The memory is configured to store data during a write operation and output the stored data during a read operation. The input register is coupled to the memory and configured to buffer input data from the external input device when requested. The input register also outputs at least a portion of the buffered input data to the memory during the write operation. The output register is coupled to the memory and configured to buffer stored data output by the memory during read operations. The output register outputs at least a portion of the buffered stored data to an external output device when requested. The logic is coupled to the memory, the input register and the output register. The logic controls the write operation in response to a write request signal from the external input device, and the read operation in response to a read request signal from the external output device.

In certain embodiments of the FIFO apparatus, the memory is an addressable random access memory, and the logic is separate synchronous logic circuitry. In accordance with certain embodiments of the present invention, the logic is further configured to arbitrate between a write request signal and a read request signal when asserted at approximately the same time. As such, the writing and reading of the memory occurs during mutually exclusive periods. To the contrary, the buffering of input data in the input register, and the outputting of previously buffered data by the output register can occur simultaneously.

The above stated needs are also met by a method for interfacing between a plurality of external devices in a first-in first out (FIFO) manner using a FIFO memory interface. This method includes receiving a write and/or read request signal from one of the external devices. Upon receiving a write request signal, the method includes buffering the input data from the external device in at least one input register, and causing the FIFO interface to conduct a write operation. The write operation includes determining a next input memory address, and storing the buffered input data in a memory based on the next input memory address.

Upon receiving a read request signal, the method includes providing previously stored data within the output register to at least one external device, and causing the FIFO interface to conduct a read operation. The read operation includes determining a next output memory address, accessing the stored data within the memory based on the next output memory address, and buffering the stored data in at least one output register. In certain embodiments, the method includes updating one or more counters such that the stored data within the memory is stored and accessed in a first-in first-out sequence.

The foregoing and other features, aspects and advantages of the present invention will become more apparent from the following detailed description of the present invention when taken in conjunction with the accompanying drawings.

BRIEF DESCRIPTION OF THE DRAWINGS

The present invention is illustrated by way of example, and not by way of limitation, in the figures of the accompanying drawings and in which like reference numerals refer to similar elements in which.

DETAILED DESCRIPTION OF THE EXEMPLARY EMBODIMENTS

The present invention provides methods and apparatus that provide a FIFO interface that is configurable to meet the needs of a variety of applications and systems. In accordance with certain embodiments of the present invention, the FIFO interface advantageously makes a conventional random access memory (RAM) function similar to a dual-ported RAM. Thus, the configurable FIFO interface takes full advantage of a variety of existing RAMs to provide a multiplicity of differing configurations. In certain embodiments of the present invention, for example, the memory is coupled to separate control logic, input and output registers. The memory, which in certain preferred embodiments is a static RAM (SRAM), can therefore be interchanged with another memory and the logic reprogrammed for use with the new memory. In certain embodiments, the control logic is provided in a programmable logic device, such as, for example, a field programmable gate array (FPGA). Thus, considering the increasing availability and lower costs of large memories, the configurable FIFO interface of the present invention will meet most system's requirements.

Figure 1:
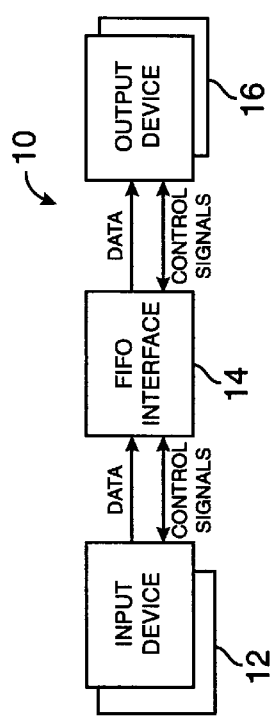
FIG. 1 is a block diagram that depicts a typical system that includes a conventional FIFO interface.
Figure 2:
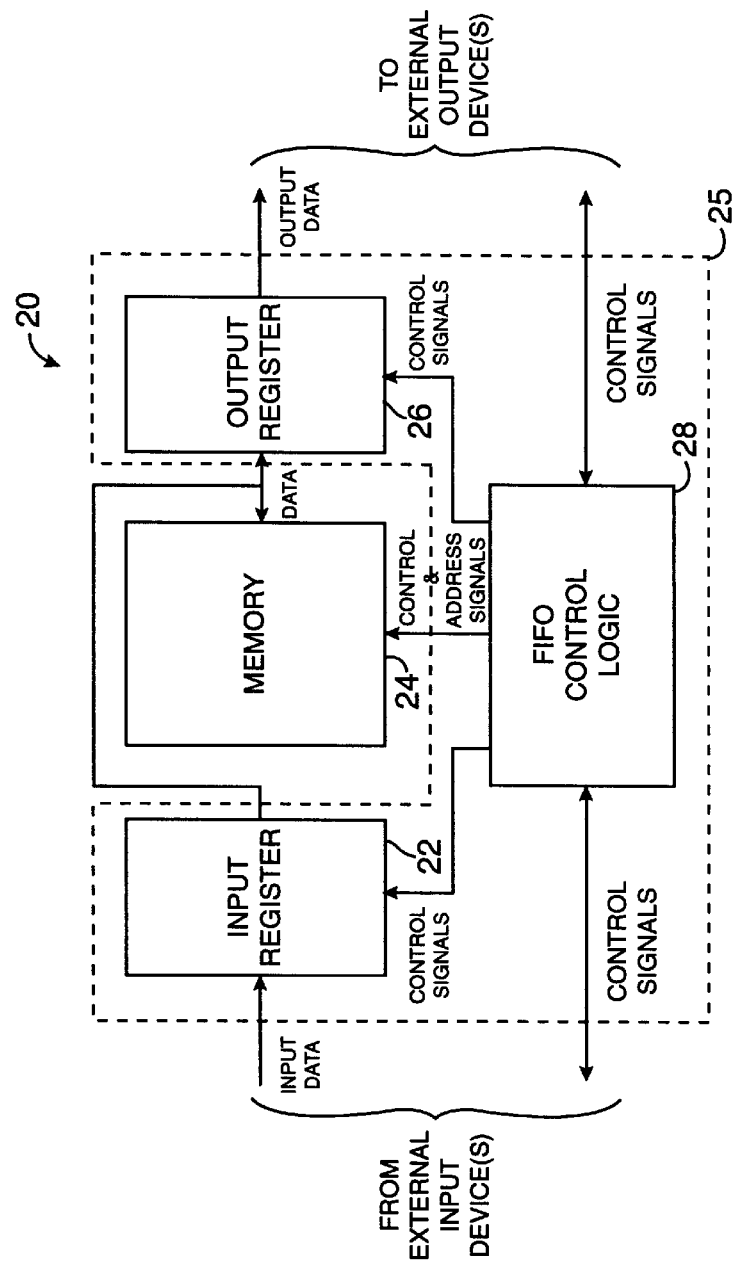
FIG. 2 is a block diagram that depicts a configurable FIFO interface having control logic for use in the system in FIG. 1, in accordance with one embodiment of the present invention.

Referring to FIG. 1, FIFO interface 14 is replaced, in accordance with the present invention, by a configurable FIFO interface 20 as depicted in FIG. 2. The data and control signals between the external devices, and configurable FIFO interface 20 are essentially the same as shown for FIFO interface 14 in FIG. 1. Thus, configurable FIFO interface 20 is adaptable for use in the same or similar applications and systems that include one or more conventional FIFO interfaces.

As depicted in the block diagram in FIG. 2, FIFO interface 20, in accordance with one embodiment of the present invention, includes an input register 22, a memory 24, an output register 26, and control logic 28. Input register 22 is coupled to one or more external input devices, such as input device 12, and is configured to buffer the input data that is received from input device 12 when a write request signal is received from input device 12. The buffered data in input register 22 is "shifted in" to memory 24 during a subsequent write operation under the control of control logic 28. As such, input register 22 is coupled to memory 24 and configured to output at least a portion of the buffered input data to memory 24 during the write operation.

Output register 26 is similar to input register 22 and is also coupled to memory 24. Output register 26 is configured to buffer the stored input data that is output by memory 24 during a subsequent read operation in which the stored input data is "shifted out" of memory 24 under the control of control logic 28. Upon receiving a read request signal, the buffered data that is currently in output register 26 is provided to one or more external output devices, such as output device 16. To accomplish this, output register 26 is configured to receive one or more control signals from control logic 28, based on the receipt of the read request signal. Additional control signals are provided to output register 26 during the subsequent read operation associated with the read request signal. Because input register 22 and output register 26 act independently in response to their respective request signals (via the corresponding control signals from control logic 28), FIFO interface 20 is capable of supporting simultaneous access by the external input and output devices 12 and 16, respectively. Thus, for example, input data can be buffered within input register 22 in response to a write request signal while buffered data in output register 26 is provided to external output device 16.

Input register 22 and output register 26 are preferably "wide" enough to store the data that is shared between the external devices. In certain embodiments, input and output registers 22 and 26 are wide enough that some of the data storage capacity will not be used in particular applications.

Control logic 28 is coupled to at least one external input device, such as input device 12, and at least one external output device, such as output device 16. Control logic 28 is configured to respond to one or more control signals from these external devices. For example, control logic 28 controls a writing operation in response to the write request signal from input device 12. During a write operation, control logic 28 controls the "shifting in" of the buffered input data from input register 22 to memory 24. Similarly, control logic 28 is configured to conduct a read operation in response to the read request signal from output device 16 by controlling memory 24 and output register 26.

Thus, in accordance with one embodiment of the present invention, control logic 28 is configured to supply an output enable control signal to input register 22 during a write operation, a clocking control signal to output register 26 during a read operation, and strobe control signals and address signals to memory 24 during both the write and read operations. Control logic 28 is further configured to generate one or more control signals regarding the status of FIFO interface 20. These status control signals are provided to the external devices.

In accordance with certain embodiments of the present invention, memory 24 and control logic 28 are separate circuits, as depicted in the block diagram of FIG. 2. By way of example, memory 24 in one embodiment of the present invention is a separate addressable RAM circuit, such as, for example, a conventional static RAM (SRAM) as represented by the block identified by reference numeral 24. In other embodiments, memory 24 is a separate dynamic RAM (DRAM). In certain exemplary embodiments, control logic 28 is embodied in a separate logic circuit or device, such as, for example a programmable logic device as represented by the block identified by reference numeral 28. Additionally, input register 22 and output register 26 in certain embodiments are also separate circuits from memory 24 and logic 28. In still other embodiments, input register 22 and output register 26 are embodied in a single circuit or device, such as, for example, a programmable logic device, as represented by the dashed line box identified by reference numeral 25. It is further recognized that one or more custom circuits or devices, such as integrated circuit dies, can be used to implement FIFO interface 20 or a portion thereof.

Figure 3:
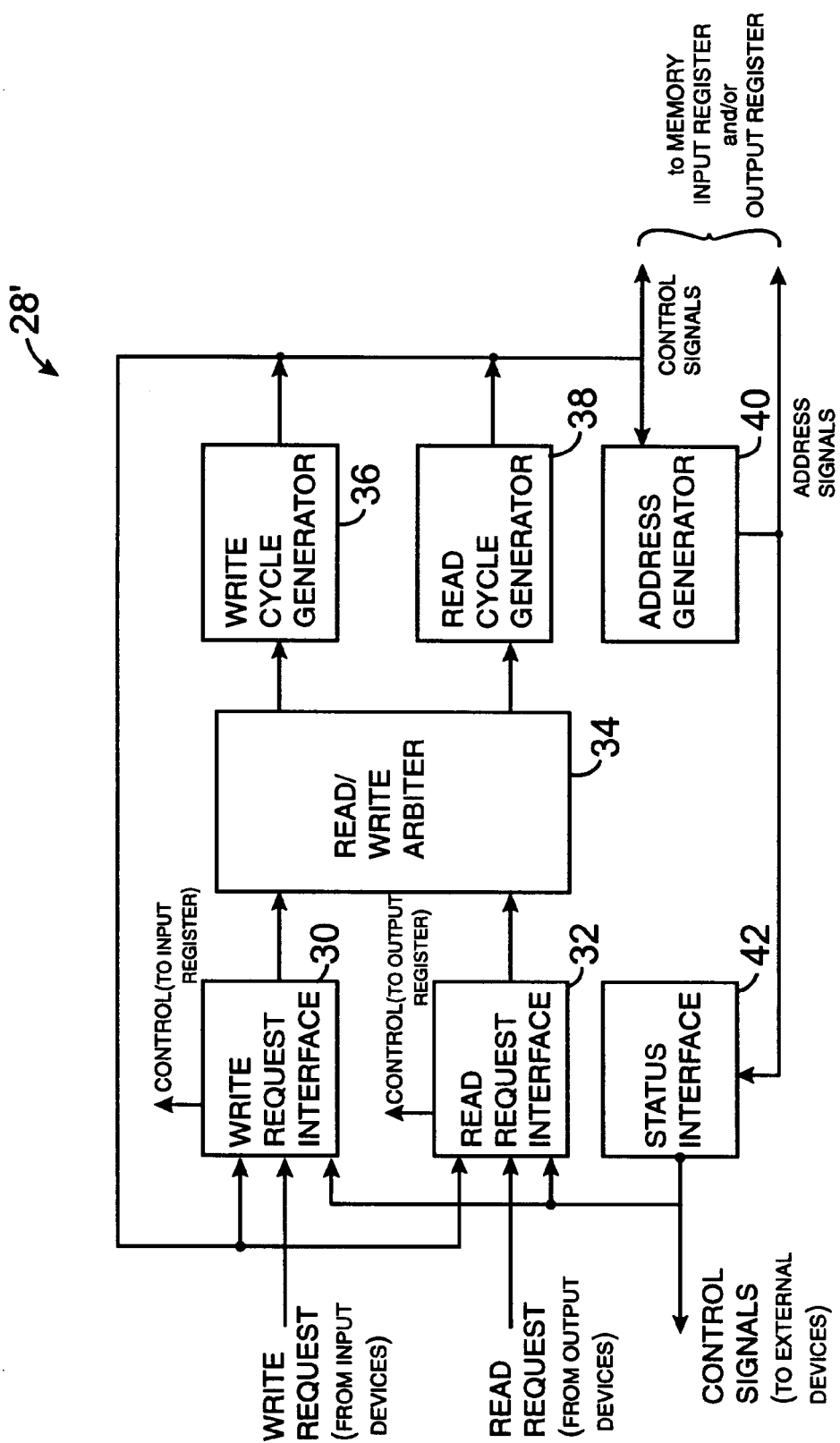
FIG. 3 is a block diagram that depicts control logic for use in the configurable FIFO interface in FIG. 2, in accordance with one embodiment of the present invention.

FIG. 3 is a block diagram depicting an exemplary embodiment of control logic 28. Control logic 28 includes a write request interface 30, a read request interface 32, an arbiter 34, a write cycle generator 36, a read cycle generator 38, an address generator 40, and a status generator 42. Although shown in block diagram format, it is recognized that control logic 28 can be fully implemented in several different forms including hardware, firmware, software (e.g., computer implemented instructions), or a combination thereof.

Write request interface 30 is configured to receive a write request from at least one external device, and various control signals from within FIFO interface 20. Upon receiving a write request signal, write request interface 30 causes input register 22 to buffer the input data received from the external device. Write request interface 30 also checks the status of FIFO interface 20 as generated by status generator 42 to determine if FIFO interface 20 is "full". If FIFO interface 20 is full, then the write operation associated with the write request must wait until FIFO interface 20 is less than full. What is meant by "full" is that the amount of stored data within memory 24 has reached a predefined threshold value, which can be as large as memory 24 itself. Assuming that FIFO interface 20 is less than full, write request interface 30 determines if control logic 28 is currently conducting a write or read operation based on one or more control signals from write cycle generator 36, read cycle generator 38, and/or address generator 40. If there is an active operation, then the write operation associated with the write request must wait until the active operation has been completed. Assuming there is no active operation, write request interface 30 outputs a corresponding write request to arbiter 34 to initiate a write operation.

Read request interface 32 is configured to receive a read request from at least one external device, and various control signals from within FIFO interface 20. Upon receiving a read request signal, read request interface 32 enables output register 26. Read request interface 32 also checks the status of FIFO interface 20 as generated by status generator 42 to determine if FIFO interface 20 is "empty". If FIFO interface 20 is empty, then the read operation associated with the read request must wait until FIFO interface 20 is no longer empty. What is meant by "empty" is that there is no stored data within memory 24, or alternatively that the amount of stored data within memory 24 has not yet reached a predefined minimum threshold value. Assuming that FIFO interface 20 is not empty, read request interface 32 determines if control logic 28 is currently conducting a write or read operation based on one or more control signals from write cycle generator 36, read cycle generator 38, and/or address generator 40. If there is an active operation, then the read operation associated with the read request must wait until the active operation has been completed. Assuming there is no active operation, read request interface 32 outputs a corresponding read request to arbiter 34 to initiate the read operation.

Because memory 24 is a shared resource, arbiter 34 is configured to select between pending write and read requests as received from write request interface 30 and read request interface 32, respectively. In accordance with certain embodiments of the present invention, arbiter 34 is configured to alternate between write and read operations when considering write and read requests that are pending at the same time. Alternatively, it is recognized that more advanced schemes can also be implemented to optimize the use of memory 24 and/or the circuits involved.

Once arbiter 34 has selected a write or a read request, the selected request is passed on to either the write cycle generator 36 or the read cycle generator 38, depending on the type of request. The operation associated with the request that was not selected must continue to wait until the operation associated with the selected request has been completed. If the selected request is a write request, then write cycle generator 36 updates address generator 40 via one or more control signals and supplies one or more write control signals to memory 24 and input register 22 to conduct a write operation. For example, an output enable control signal is asserted on input buffer 22 to allow the buffered input data to be "shifted in" to memory 24 based on an address generated by address generator 40. The buffered input data is "shifted in" to memory 24 by strobe control signals from control logic 28.

Conversely, if the selected request is a read request, then read cycle generator 38 updates address generator 40 via one or more control signals and supplies one or more read control signals to memory 24 and output register 26 to conduct a read operation. The read control signals cause the stored data within memory 24 to be output by memory 24 and buffered within output register 26. The stored data within memory 24 is selected based on an address generated by address generator 40.

Address generator 40 determines the address that is used during the write and read operations to store and retrieve input data, respectively, within memory 24. Address generator 40, in accordance with certain exemplary embodiments of the present invention, includes address counters or pointers that identify the size of the memory (e.g., the range of addresses available), a next input address and a next output address such that FIFO interface 20 operates in a first-in first-out sequential order during write and read operations. Thus, address generator 40, in response to one or more write or read control signals, adjusts one or more address counters or pointers to determine the next input or next output address.

By way of example, assume that memory 24 has 1000 addressable addresses or slots and that thus far 400 of the slots have been used to store input data but none of these slots have been read. As a result, an incremented write counter or pointer would read 400 and each successive write operation would result in an incremental change. Thus, for example, during the next write operation, the write counter or pointer in one embodiment would be changed to 401. Currently, however, in this example the write counter is at 400 and the read counter or pointer is at 1 because the "first-in" stored data in slot 1 has yet to be read. Thus, the read counter or pointer, in this exemplary embodiment, will be incrementally changed during each successive read operation. It is recognized that other memory allocation/ tracking schemes will also work, and that the read and write counters or pointers can be combined in certain embodiments, with the goal being to maintain the first-in first-out ordering of stored input data.

In accordance with certain preferred embodiments of the present invention, an automatic read operation is conducted following an initial or first write operation. The automatic read operation allows FIFO interface 20 to be "primed" by having the "first-in" input data read from memory 24 and buffered in output register 26. Thus, the buffered data within output register 26 is ready to be provided to external output device 16 when FIFO interface 20 receives the first read request signal.

Status generator 42 is configured to monitor the addresses generated by address generator 40, or alternatively to monitor one or more counters or pointers within address generator 40 and/or the control signals used within FIFO interface 20 in order to determine the status of FIFO interface 20. Status generator 42 provides one or more status control signals to the external devices and/or within control logic 28. For example, status generator 42 in certain exemplary embodiments of the present invention determines if FIFO interface 20 is either "full" or "empty", as described above. This is accomplished in one embodiment by comparing the number of used slots, as determined by the write and read counters or pointers and a known maximum or minimum value, to one or more predefined threshold values. Other embodiments include additional status control signals that are based on still different thresholds. For example, status generator 42 in certain embodiments generates an "almost empty", a "half full" and an "almost full" status control signal or flag that is provided to the external device. These flags are determined based on predefined thresholds and/or percentages, in one embodiment.

Address generator 40 and status generator 42, in certain preferred embodiments, are programmable such that control logic 28 can be configured to allow memory 24 to be interchanged or swapped with another memory having a different configuration (e.g., different length and/or width). For example, by changing the counters or pointers and threshold values within address generator 40 and status generator 42, control logic 28 can be configured to function with (or as) a smaller or larger memory.

Figure 4:
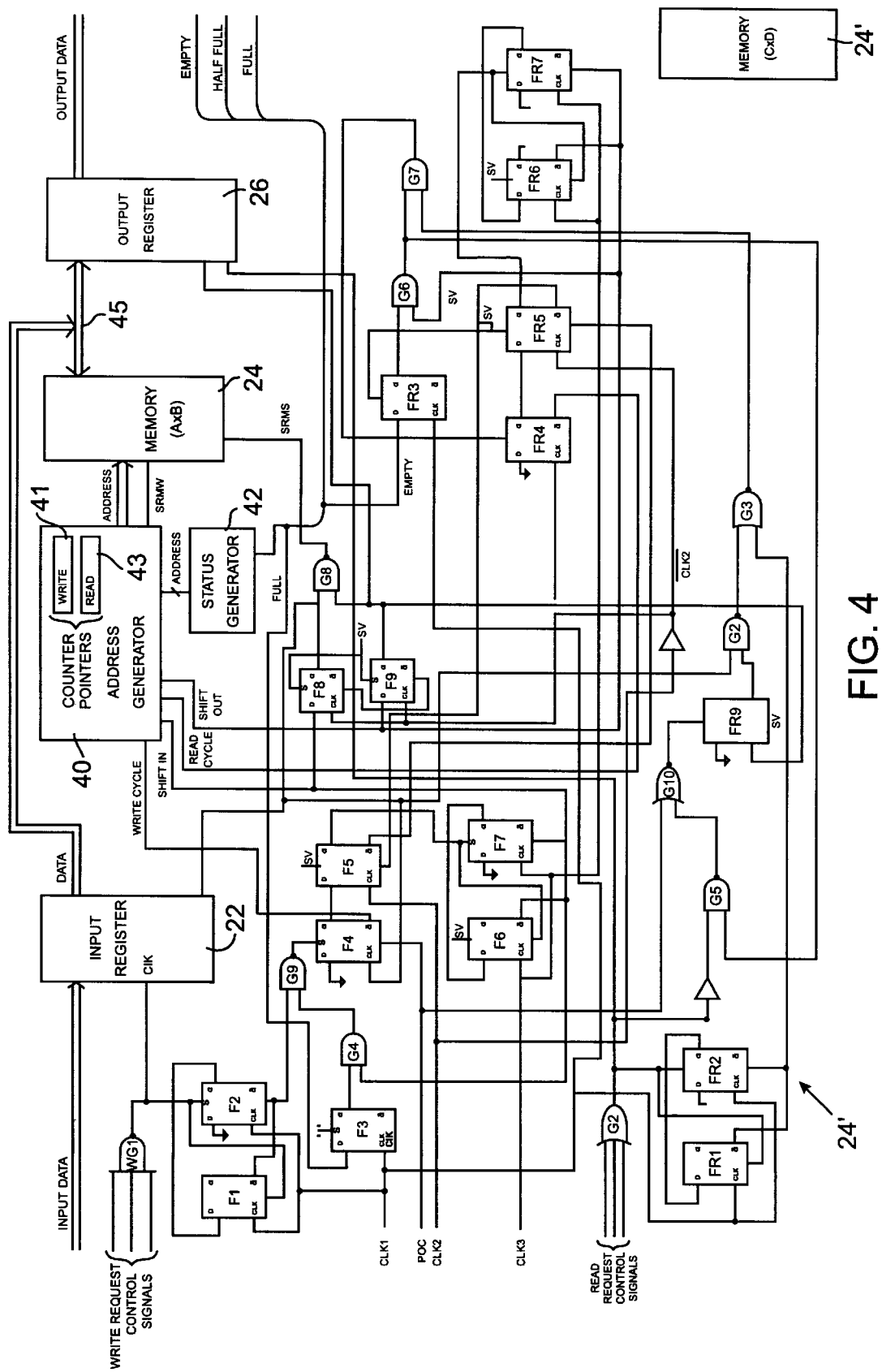
FIG. 4 schematically depicts an exemplary embodiment of control logic as in FIG. 3, in accordance with one embodiment of the present invention.

FIG. 4 schematically depicts control logic 28', in accordance with an exemplary embodiment of the present invention. Control logic 28' includes block representations for input register 22, memory 24, output register 26, address generator 40, and status generator 42, as described above. Within address generator 40 there are representational blocks 41 and 43 that depict a plurality of address counters or pointers, such as, for example, a write counter or pointer, a read counter or pointer, a memory configuration counter or pointer, and/or a threshold value counter or pointer. In certain embodiments, the information within blocks 41 and 43 are available to status generator 42. FIG. 4 also includes a block that represents an interchangeable memory 24' that is configured differently than memory 24, as described above.

Control logic 28' uses three different clocks, CLK1, CLK2 and CLK3 that are externally generated and used to synchronize the various gates and flip-flops which respond to and/or support write and/or read operations. These clocks are also presented and discussed in the timing diagrams of FIGS. 5 and 6 and the text related thereto. Additionally, control logic 28' is responsive to an externally generated POC signal that identifies an initial power on process.

The various gates and flip-flops shown in FIG. 4 can be mapped to the blocks in FIG. 3. Write request interface 30 includes flip-flops F1, F2, F3, F4, and gates WG1, G4, and G9. Read request interface 32 includes flip-flops FR1, FR2, FR3, FR4, FR9, and gates RG1, G1, G2, G3, G5, G6, G7, and G10. Arbiter 34 includes flip-flops F5 and FR5. Write cycle generator 36 includes flip-flops F6, F7 and F8. Read cycle generator 38 includes flip-flops FR6, FR7 and FR8. Gate G8 is essentially shared by both write cycle generator 36 and read cycle generator 38. Those skilled in the art will recognize that other logic arrangements and/or components can be used to achieve the same tasks, functions and goals.

With this in mind, the important features of the logic will be discussed with regard to receipt of a write request signal and a read request signal. A write request signal is received by gate WG1. The output of gate WG1 is provided to input register 22 (causing the input data to be buffered therein), and to flip-flop F2. Flip-flops F1 and F2 form a digital one-shot wherein the complimentary output of flip-flop F1 provides an active-low pulse that is equal to one clock period of CLK2. This active-low pulse is applied to an input of gate G9. Gates G9 and G4 and flip-flop F3 determine if the write request can be handled. Flip-flop F3 identifies if the FIFO is "full" based on the full status control signal that is output by status generator 42. If the FIFO is not "full", the normal (i.e., Q) output of flip-flop F3 sets flip-flop F4 through gates G4 and G9. Gate G4 determines if there is an active operation.

Flip-flop F5 is the write arbiter flip-flop and flip-flop FR5 is the read arbiter flip-flop. As depicted flip-flops F5 and FR5 are cross-coupled such that if one of the flip-flops has a pending or active request, the other will wait until the request has been handled. When forced to wait flip-flops F4 and FR4 will hold the write or read request, respectively, until the active operation has been completed. When flip-flop F5 is set, flip-flop FR5 is held in a reset state until the active operation has been completed. Likewise, when flip-flop FR5 is set, flip-flop F5 is held in a reset state until the active operation has been completed. To avoid conflicts flip-flops F5 and FR5 are latched on the opposite edges of CLK2 due to the inversion of CLK2 by gate G1.

If there is no active operation, flip-flop F5 is set by the next rising edge of CLK2. Flip-flops F6, F7, F8, and gate G8 assert write control signals on memory 24. Thus, on the next rising edge of CLK3 a write control signal is applied to memory 24 through gate G8 that is equal to one clock period of CLK3. In this embodiment, address generator 40 supplies a write enable control signal to memory 24 during the write cycle based on the inputs received from flip-flops F4 and F6. During the write cycle, output register 26 presents a high-impedance (HI-Z) on the shared data bus 45.

The logic provided to handle a read request signal is similar to that described above with regard to the handling of a write request signal. Additional logic is provided, in this exemplary embodiment, to conduct an automatic read cycle following an initial write cycle (i.e., memory 24 was previously empty). This automatic read cycle provides the initial stored input data (e.g., the first-in) to output register 26. Included in this additional logic are flip-flop FR9, and gates G2, G3, and G5. This logic causes the automatic read cycle to occur at the end of the initial write cycle.

Following the automatic read cycle, normal read request signals are received by gate RG1. The output of gate RG1 is provided to the output enable pin of output register 26, and to flip-flop FR2. Flip-flops FR1 and FR2 form a digital one-shot wherein the complimentary output of flip-flop FR1 provides an active-low pulse that is equal to one clock period of CLK2. This active-low pulse is applied to an input of gate G3. Gates G3, G7 and flip-flop FR3 determine if the read request can be handled. Flip-flop FR3 identifies if FIFO interface 20 is "empty" based on the empty status control signal that is output by status generator 42. If FIFO interface 20 is not "empty", the normal (i.e., Q) output of flip-flop FR3 sets flip-flop F4 through gates G6 and G7. Gate G6 determines if there is an active operation.

As described above, flip-flop FR5 is the read arbiter flip-flop which is cross-coupled to flip-flop F5 which is the write arbiter flip-flop. Thus, if one of the flip-flops has a pending or active request, the other will wait until the request has been handled. When forced to wait, flip-flop FR4 will hold the read request until the active operation has been completed. When flip-flop FR5 is set, flip-flop F5 is held in a reset state until the active operation has been completed. Likewise, when flip-flop FR5 is set, flip-flop F5 is held in a reset state until the active operation has been completed.

If there is no active operation, flip-flop FR5 is set by the next rising edge of CLK2. Flip-flops FR6, FR7, FR8, and gate G8 assert read control signals on memory 24. Thus, on the next rising edge of CLK3 a read control signal is applied to memory 24 through gate G8 that is equal to one clock period of CLK3. In this embodiment, address generator 40 supplies a read enable control signal to memory 24 during the read cycle based on the inputs received from flip-flops FR4 and FR6. During the read cycle, input register 22 presents a high-impedance (HI-Z) on the shared data bus 45.

Figure 5:
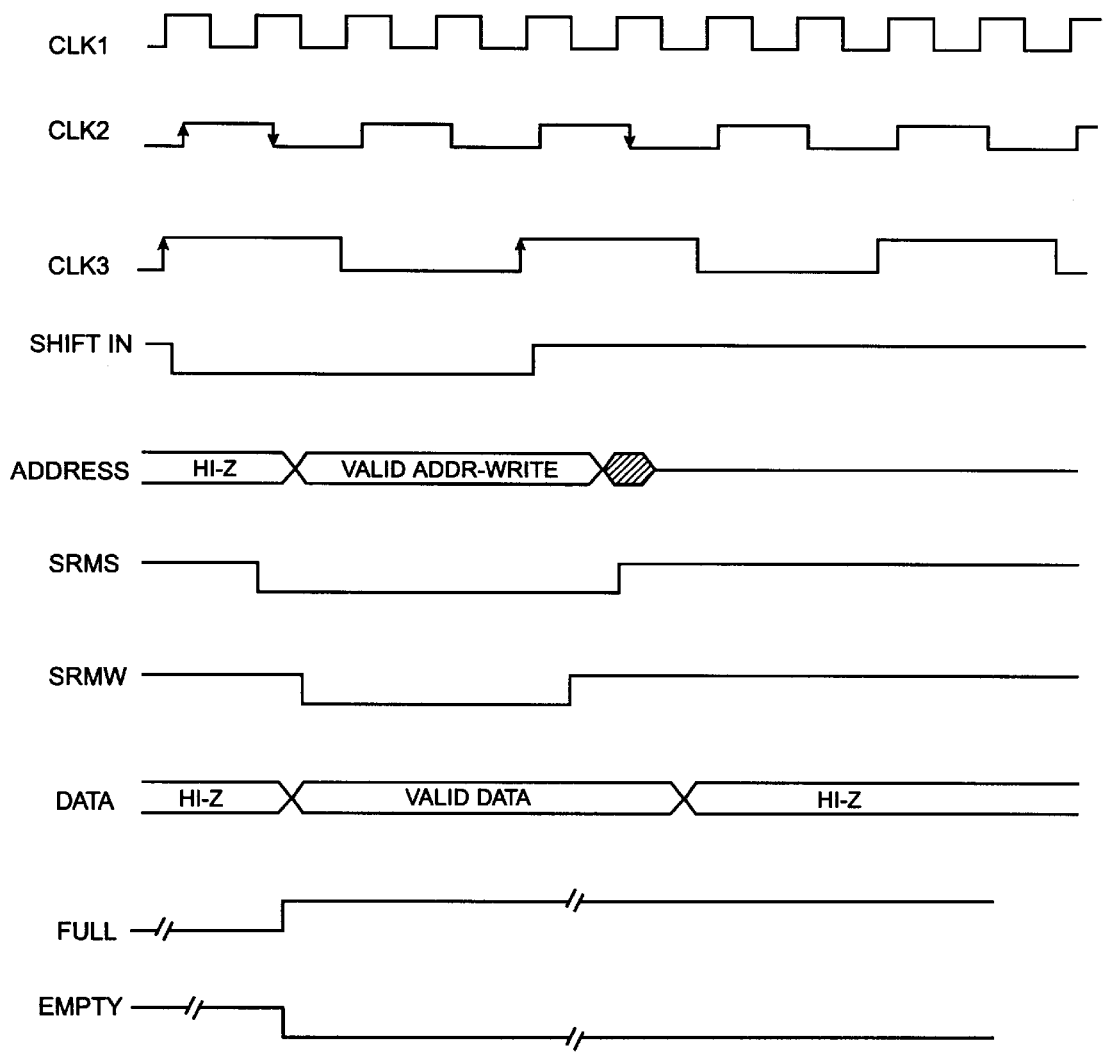
FIGS. 5 and 6 are timing diagrams depicting various signals associated with the control logic in FIG. 4.
Figure 6:
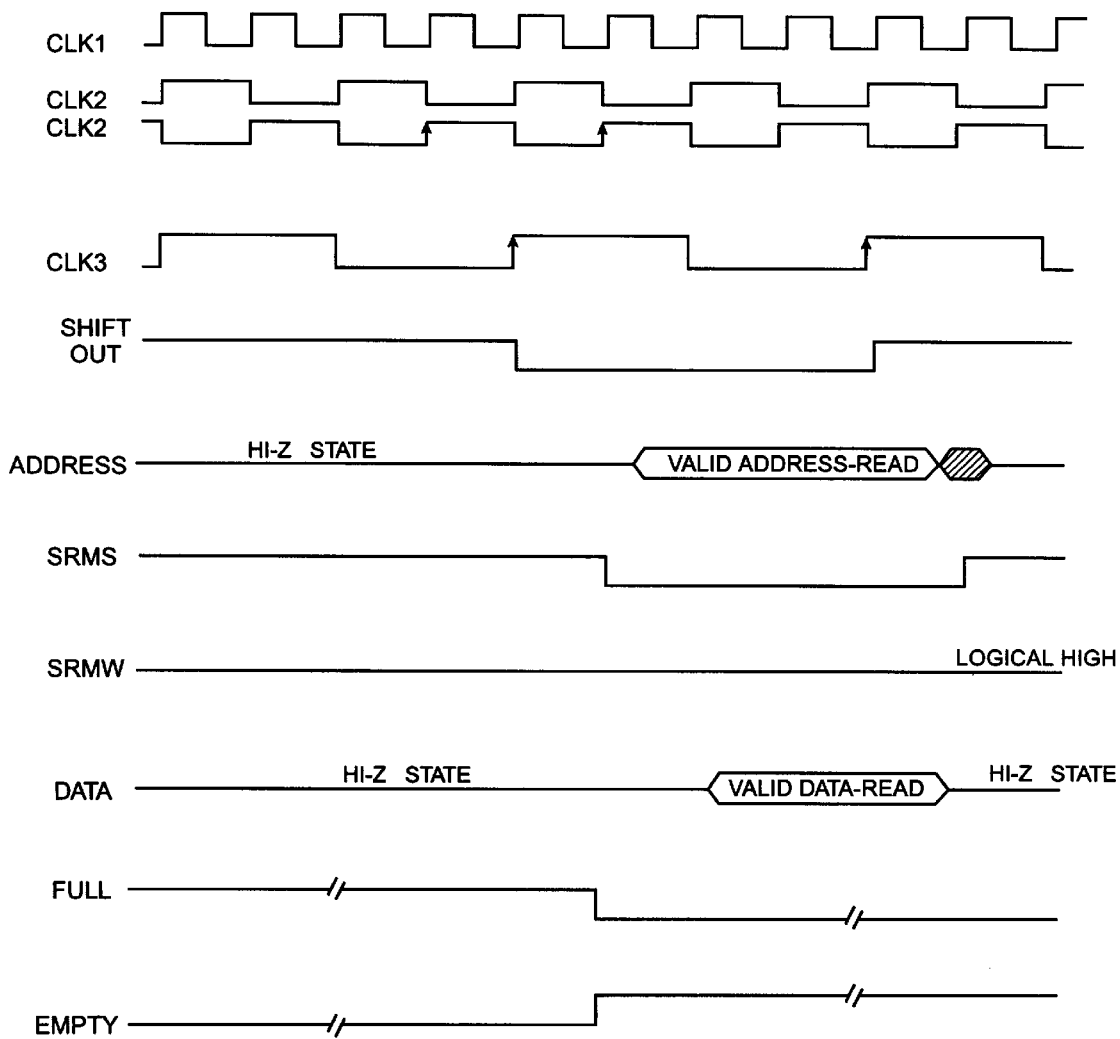

FIGS. 5 and 6 depict various signals within control logic 28' during a write and a read operation, respectively. FIFO interface 20, from the perspective of the external devices, operates asynchronously. However, as described above and depicted in FIG. 4, control logic 28' in the exemplary embodiment is synchronous logic. Timing within control logic 28' is supplied externally as CLK1, CLK2, and CLK3 signals. The relationship between these clock signals is depicted in FIGS. 5 and 6. CLK is the main clock signal, from which CLK2 and CLK3 can be derived. CLK1, CLK2 and CLK3 each have a 50% duty cycle. CLK2 has twice the period as CLK1, and CLK3 has twice the period as CLK2. In FIG. 6, the compliment of CLK2 is also shown, as generated by gate G1.

In FIG. 5, during the write operation, the SHIFT IN signal from flip-flop F6 causes address generator 40 to output the next write address as depicted by the ADDRESS signal. As the SRMS and SRMW control signals are asserted on memory 24, the DATA (i.e., buffered input data) is stored in memory 24. The FULL and EMPTY status control signals from status generator 42 are also depicted to illustrate the logic in FIG. 4.

Similarly, in FIG. 6, during a read operation, the SHIFT OUT signal from flip-flop FR6 causes address generator 40 to output the next read address as depicted by the ADDRESS signal. As the SRMS and control signal is asserted and the SRMW control signal is de-asserted on memory 24, the DATA (i.e., stored input data) is retrieved from memory 24 and output to shared data bus 45. Again, the FULL and EMPTY status control signals from status generator 42 are depicted to illustrate the logic in FIG. 4.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A first-in first-out (FIFO) apparatus for use with an external input device and an external output device, the apparatus comprising:

memory configured to store data during a write operation and output the stored data during a read operation;

an input register coupled to the memory and configured to buffer input data from an external input device and output at least a portion of the buffered input data to the memory during the write operation;

an output register coupled to the memory and configured to buffer the stored data output by the memory during the read operation and output at least a portion of the buffered stored data to an external output device;

logic at least externally coupled to the memory, the input register and the output register, and configured to control the write operation in response to a write request signal from the external input device, and the read operation in response to a read request signal from the external output device;

a means for verifying that the memory is not full and that a previous write operation is not being conducted prior to buffering the input data in the input register; and a means for verifying that the memory is not empty and that a previous read operation is not being conducted prior to accessing the stored data within the memory.

2. The apparatus as recited in claim 1, wherein the memory comprises an addressable random access memory (RAM) that functions similar to a dual-ported RAM as a result of the apparatus, whereby said RAM allows said input device and said output device to simultaneously access different stored data for at least storage and processing.

3. The apparatus as recited in claim 2, wherein the logic comprises synchronous logic circuitry.

4. The apparatus as recited in claim 3, wherein the memory is external to the logic.

5. The apparatus as recited in claim 2, wherein the logic is further configured to arbitrate between the write request signal and the read request signal when the write and read request signals are asserted at approximately the same time, such that the write and read operations are conducted during mutually exclusive periods of time.

6. The apparatus as recited in claim 5, wherein the logic comprises:

a write request interface configured to receive the write request signal from the first external device;

a read request interface configured to receive the read request signal from the second external device;

an arbiter coupled to the write request interface and the read request interface and configured to arbitrate between the write request signal and the read request signal;

a write cycle generator coupled to the arbiter and the memory and configured to control access to the memory during the write operation; and a read cycle generator coupled to the arbiter and the memory and configured to control access to the memory during the read operation.

7. The apparatus as recited in claim 6, wherein the logic further comprises an address generator coupled to the write cycle generator, the read cycle generator, and the memory, and configured to provide at least one address to the memory during the read operation and the write operation.

8. The apparatus as recited in claim 7, wherein the logic further comprises a status generator coupled to the address generator and configured to output at least one status control signal, wherein the status control signal is based on an amount of the memory used to store data.

9. The apparatus as recited in claim 8, wherein the logic is located within at least one programmable logic device.

10. The apparatus as recited in claim 1, wherein the memory is interchangeable and the logic can be programmed to control an interchanged memory having a different configuration than the memory.

11. The apparatus as recited in claim 1, wherein the logic is further configured to at least directly and indirectly interface a plurality of external input devices with a plurality of external output devices.

12. A method for interfacing between a plurality of external devices in a first-in first-out (FIFO) manner using a FIFO memory interface, the method comprising:
   receiving at least one request signal from one of the plurality of external devices, wherein the request signal is selected from a write request signal and a read request signal;
   upon receiving the write request signal, buffering in at least one input register input data from the one of the plurality of external devices that asserted the write request signal and causing the FIFO interface to conduct a write operation comprising determining at least one next input memory address, and storing at least a portion of the buffered input data in a memory based on the next input memory address;
   upon receiving the read request signal, providing previously stored data within at least one output register to the one of the plurality of external devices that asserted the read request signal and causing the FIFO interface to conduct a read operation comprising determining at least one next output memory address, accessing the stored data within the memory based on the next output memory address, and buffering the stored data in at least one output register;
   verifying that the memory is not full and that a previous write operation is not being conducted prior to buffering the input data in the input register; and
   verifying that the memory is not empty and that a previous read operation is not being conducted prior to accessing the stored data within the memory.

13. The method as recited in claim 12, wherein determining at least one next input memory address and determining at least one next output memory address includes updating one or more counters such that the stored data within the memory is stored and accessed in a first-in first-out sequence.

14. The method as recited in claim 12, further comprising arbitrating between concurrently received write request and read request signals such that the FIFO interface conducts the corresponding read and write operations during separate periods of time.

15. The method as recited in claim 12, further comprising determining an amount of the memory that has been used to store data, and outputting at least one control signal corresponding to the amount of memory that has been used to store data to at least one of the plurality of external devices.

16. The method as recited in claim 12, further comprising upon completion of an initial write operation, causing the FIFO interface to automatically conduct a read operation.

17. The method as recited in claim 12, wherein the memory comprises an addressable random access memory.

18. The method as recited in claim 17, wherein the FIFO interface comprises logic that is external to the memory.

19. A method for interfacing between a plurality of external devices in a first-in first-out (FIFO) manner using a FIFO memory interface, the method comprising:
   receiving at least one request signal from one of the plurality of external devices, wherein the request signal is selected from a write request signal and a read request signal;
   upon receiving the write request signal, buffering in at least one input register input data from the one of the plurality of external devices that asserted the write request signal and causing the FIFO interface to conduct a write operation comprising determining at least one next input memory address, and storing at least a portion of the buffered input data in a memory based on the next input memory address;
   upon receiving the read request signal, providing previously stored data within at least one output register to the one of the plurality of external devices that asserted the read request signal and causing the FIFO interface to conduct a read operation comprising determining at least one next output memory address, accessing the stored data within the memory based on the next output memory address, and buffering the stored data in at least one output register; and
   verifying that the memory is not full and that a previous write operation is not being conducted prior to buffering the input data in the input register.

20. A method for interfacing between a plurality of external devices in a first-in first-out (FIFO) manner using a FIFO memory interface, the method comprising:
   receiving at least one request signal from one of the plurality of external devices, wherein the request signal is selected from a write request signal and a read request signal;
   upon receiving the write request signal, buffering in at least one input register input data from the one of the plurality of external devices that asserted the write request signal and causing the FIFO interface to conduct a write operation comprising determining at least one next input memory address, and storing at least a portion of the buffered input data in a memory based on the next input memory address;
   upon receiving the read request signal, providing previously stored data within at least one output register to the one of the plurality of external devices that asserted the read request signal and causing the FIFO interface to conduct a read operation comprising determining at least one next output memory address, accessing the stored data within the memory based on the next output memory address, and buffering the stored data in at least one output register; and
   verifying that the memory is not empty and that a previous read operation is not being conducted prior to accessing the stored data within the memory.

* * * * *